United States Patent

Schwerin

[15] 3,680,581
[45] Aug. 1, 1972

[54] APPARATUS FOR REGULATING A FIRST FLOW DEPENDING ON A CONTROLLED SECOND FLOW

[72] Inventor: Günther Schwerin, Eichenweg, Germany

[73] Assignee: Robert Bosch GmbH, Stuttgart, Germany

[22] Filed: June 25, 1970

[21] Appl. No.: 49,848

[30] Foreign Application Priority Data

June 28, 1969 Germany .............P 19 32 995.4

[52] U.S. Cl..............................137/101, 137/117
[51] Int. Cl............................................G05d 11/03
[58] Field of Search....................137/100, 101, 117

[56] References Cited

UNITED STATES PATENTS 1,558,529  10/1925  Wunsch........................137/100
3,435,838  4/1969   Bower...........................137/101

Primary Examiner—Robert G. Nilson
Attorney—Michael S. Striker

[57] ABSTRACT

A pressure fluid and a control fluid are supplied to a valve cylinder in which a valve slide forms a first pair of variable chambers receiving the pressure fluid through two inlets and discharging the same through two outlets. Two stationary pistons form in the valve slide a second pair of variable chambers receiving and discharging the controlled fluid. The fluid pressures in the variable chambers act in opposite directions on the valve slide and each chamber increases (or decreases) in volume as the correlated chamber decreases (or increases). Throttles, or a control valve with throttling control edges, produce a pressure differential between the variable chambers of each pair until the valve slide assumes a balanced position in which the flow of pressure fluid is substantially proportional to the measured and controlled flow of the control fluid.

15 Claims, 3 Drawing Figures

PATENTED AUG 1 1972

3,680,581

INVENTOR
Günther SCHWERIN

By
*Michael J. Striker*
ITS ATTORNEY

APPARATUS FOR REGULATING A FIRST FLOW DEPENDING ON A CONTROLLED SECOND FLOW

BACKGROUND OF THE INVENTION

The invention relates to apparatus for controlling a first flow of a pressure fluid depending on a second flow of a control fluid and having a control slide on which differential pressures of two measuring points of the first and second flows, respectively, act in opposite directions.

The German patent 402,852 discloses a mixing device for gas in which a secondary flow is controlled in a relation to a main flow. Venturi nozzles are used whose suction actuates a regulator for the secondary flow. The device is unsuitable for the control of the flow of liquids, and is expensive to manufacture.

A follower device is known by which a program controlled motion is regulated by an independent stream of oil. The apparatus includes two mechanically connected cylinders, and a valve regulating the main oil flow. The apparatus can only be used for very special operational conditions.

SUMMARY OF THE INVENTION

It is one object of the invention to provide a control apparatus for regulating a first flow of a pressure medium dependent on a second flow of a control medium which is varied in accordance with the program.

Another object of the invention is to provide an apparatus of extremely simple construction capable of controlling the flow of a liquid in accordance with a program.

It is another object of the invention to control the movements of a valve slide in such a manner that the flow of a pressure fluid is substantially proportional to the flow of a control fluid.

With these objects in view, the present invention provides on either side of a control slide, two pressure chambers of which pairs of opposite chambers are provided with flows of fluid, respectively. In this manner, different pressures can be made to act on a regulating slide, resulting in a very compact construction of the apparatus.

In one embodiment of the invention, chambers are formed by stationary pistons located in bores of a movable valve slide. Throttling means are advantageously provided for producing pressure differentials between opposite chambers in which the fluid acts in opposite directions on the valve slide.

An additional throttle obtains a predetermed deviation from the exact proportionality of the main flow of pressure fluid to the control flow of control fluid. When the measuring points of the pressure fluid conduit and control fluid conduit are formed as throttles, a particularly simple and compact construction of the apparatus is obtained. The use of throttles is particularly suited for fluid flows which vary only little. For apparatus controlling very different flows of fluid, it is advantageous to use a control valve for obtaining the required pressure differentials, since the energy losses are less, and the quality of the regulation is independent of the volume of the pressure fluid flow. The invention is advantageously used with harvesting machines in which the rotary speed of apparatus is to be regulated proportionally to the speed of the vehicle.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
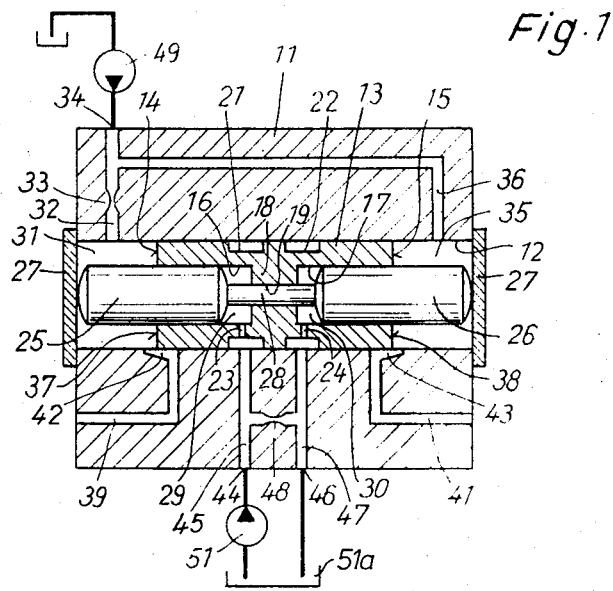
FIG. 1 is a schematic sectional view illustrating a first embodiment of the invention.

Referring first to FIG. 1, a housing body 11 has a traversing cylinder bore 12 in which a regulating valve slide 13 is guided in a sealed condition. At the opposite end portions of regulating slide 13, axially extending blind bores 16 and 17 are provided. The central portion between the axial bores 16 and 17 has a bearing bore 19. The outside of the substantially cylindrical regulating valve slide 13 has two annular recesses 21 and 22. Each annular recess 21, 22 is connected by a bore 23 and 24, respectively, with the bores 16 and 17.

In each bore 16 and 17 a piston 25 and 26, respectively, is slidably mounted. Pistons 25, 26 abut with their end faces on fixed covers 27 of housing 11. The pistons 25, 26 are connected by a piston rod which is slidable in the axial bore 19, and sealed in the same so that valve slide 13 can move relative to pistons 25 and 26, and piston rod 28, in an axial direction. The pistons 25 and 26 form in axial bores 16 and 17, variable chambers 29 and 30.

In the same manner, annular chambers are formed in cylinder bore 12 at opposite ends of the regulating valve slide 13 so that a variable chamber 31 surrounds piston 25 and a variable chamber 35 surrounds piston 26.

A pump 49 has an outlet 34 pumping pressure fluid into the inlet 32 which has a throttle 33 and opens in chamber 31. Another conduit 36 connects inlet conduit 32 upstream of throttle 33 with chamber 35.

In the illustrated central balanced position of regulating valve slide 13, the control edges 37, 38 of the end faces 14, 15 close first and second outlets 39 and 41, a variable flow cross-section remaining for fine adjustment due to the shape of the ports 42 and 43 of the first and second outlets 39 and 41. The first outlet 39 is connected with consumer apparatus, and the second outlet 41 is connected with a low pressure space, or with another consumer apparatus.

A control supply pump 51 pumps a control fluid through the outlet 44 into the control inlet 45 which communicates with the annular chamber 21 and through a duct 23 with the variable chamber 29. The other variable chamber 30 of the pair of chambers 29, 30, is connected by a duct 24 with the annular recess 22 which communicates with the control outlet 47 leading to the inlet 46 through which control fluid is discharged into a receptacle 51a from where it can be pumped again by control pump 51. The duct including the throttle 48 connects control inlet 45 with control outlet 47.

The pressure fluid supplied by pump 49 acts in the pair of chambers 31, 35 in opposite directions on the valve slide 13, while the control fluid in the pair of chambers 29, 30 also acts on valve slide 13 in opposite directions since the pistons 25 and 26 are stationary.

The inlet 34, 32 receives a constant flow of pressure fluid from supply pump 49, and inlet 44, 45 receives a controlled amount of control fluid from pump 51 in accordance with a program.

The apparatus operates as follows:

The control supply pump 51 pumps a variable flow of control fluid through control inlet 45, throttle 48, and control outlet 46 from where it is discharged into container 51a for circulation by control pump 51. Throttle 48 produces a pressure differential which acts through annular recesses 21, 22, ducts 23, and the pair of chambers 29, 30 on regulating valve slide 13 urging the same toward piston 26 to reduce the volume of chamber 30.

A flow of pressure fluid is pumped at the same time by supply pump 45 and flows partly over the throttle 33 into chamber 31, and over the control port 42 into the first outlet 39, while another part of the pressure fluid flows through conduit 36 into chamber 35 of the pair of variable chambers 31, 35, and acts on regulating valve slide 13 to urge the same to move toward the chamber 31, reducing the volume of the same.

The effective surfaces of regulating slide valve 13 are the same in all chambers 29, 30, 31, 35 so that regulating valve slide 13 assumes a balanced position in which the pressure differential at the first throttle 33 is equal to the pressure differential at the second throttle 48. Consequently, the ratio between the amounts of fluid flowing through the two throttles 33, 48 is directly proportional to the ratio of the open throttling flow cross-sections of throttles 33, 48. As a result, the volume of the flow of pressure fluid flowing out of the first outlet 39 is always proportional to the variable control flow which is supplied by control pump 51 and flows over the second throttle 48. The excess amount of pressure fluid pumped by the pump and not flowing out of the first outlet 39 flows through the second outlet 41 either to another consumer, or to a container from which the supply pump 49 sucks the pressure fluid.

Figure 2:
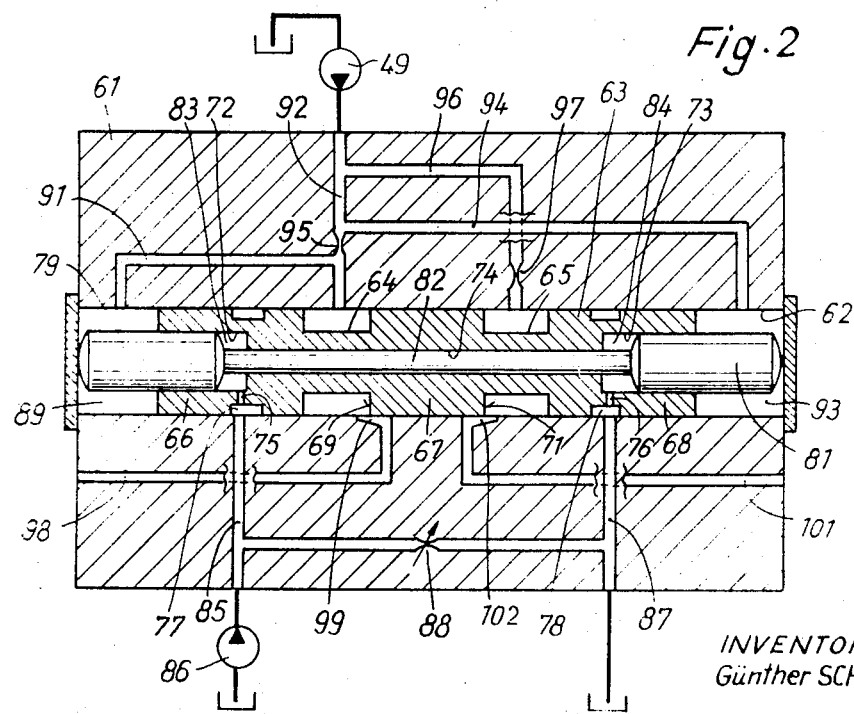
FIG. 2 is a schematic sectional view illustrating a second embodiment of the invention.

As compared with the embodiment of FIG. 1, the embodiment of FIG. 2 obtains a more accurate regulation by providing separate chambers for the comparison of the pressure, and for the control of the valve slide.

The housing 61 has a cylinder bore 62 in which a regulating valve slide 63 is slidably mounted in a sealed condition. Two annular recesses 64, 65 divide regulating valve slide 63 into three piston portions 66, 67, 68 of which the central piston portion 57 has two control edges 69, 71. The outer piston portions 66 and 68 have axial blind bores 72, 73 which are connected by a bearing bore 74 with each other. Ducts 75, 76 connect the axial cylinder bores 72, 73 with annular recesses 77, 78. Stationary pistons 79 whose ends abut covers of housing 61 are located in the axial bores 72 and 73, and are connected by a piston rod 82 guided in bearing bore 74 for sliding movement so that they abut the covers of housing 61. A pair of chambers 83 and 84 is formed by pistons 79 and 81 in pistons portions 66 and 68 of valve slide 63. Chamber 83 is connected by duct 75 and annular recess 77 with the control inlet 85 of control pump 86, while chamber 73 is connected by duct 76 and annular recess 78 to the control outlet 87 which is connected by a variable throttle 88 with control inlet 85, and discharges into a container from which control pump 86 sucks the control fluid.

Another pair of variable chambers 89, 93 is formed at the ends of the regulating valve slide 63, and the pistons 79 and 81 are located in the same.

The pressure pump 49 pumps pressure fluid through inlet means 92 which is connected with a first pair of ducts 91 and 94 respectively communicating with chambers 89 and 93, but are separated by a first throttle 95. An extension of inlet 92 opens into the annular recess 64 downstream of throttle 95. Upstream of conduits 91, 94, another conduit 96 is connected with the annular recess 65 by a throttle 97. The piston portion 67 of regulating valve slide 63 has in the annular recess 64, a control edge 69, and in the annular recess 65, a control edge 71. The first outlet 98, which is connected with consumer apparatus, communicates with the annular space 64, and the second outlet, which is connected with the low pressure space, communicates with the annular recess 65. Outlet 98 has a control port 99, and outlet 101 has a control port 102, the control ports 99 and 102 cooperating with the control edges 69 and 71 to permit a gradually varying flow during movement of control valve slide 63. As compared with the function of the apparatus described with reference to FIG. 1, the apparatus shown in FIG. 2 is differently designed in that the pressure differential produced at the first throttle 95 is effective through conduit 91 and 94, and chambers 89 and 93 to move the regulating valve slide 63, while the flow regulation takes place in the chambers formed by the annular recesses 64 and 65. Due to the separation of functions, a more exact transfer of the pressure to the regulating valve slide is possible.

Since the second throttle 88 is variable, the ratio of the pressure fluid flow through the first outlet 98 to the control flow of control pump 86 can be adjusted as desired.

The third throttle 97 in inlet conduit 96 has the effect that the pressure fluid flowing through the first outlet 98 is not proportional to the flow of control fluid produced by control pump 86. Due to this fact, the pressure fluid flowing through the first outlet 98, is not interrupted when the flow of control fluid into control inlet 85 is stopped. If a proportional regulating is desired, throttle 97 can be constructed in such a manner that it becomes effective only when the flow of control fluid from pump 86 stops. It is also possible to make throttle 95 variable, instead of throttle 88, and the decision which throttle is made variable depends on the operational conditions under which the apparatus is to be used.

Figure 3:
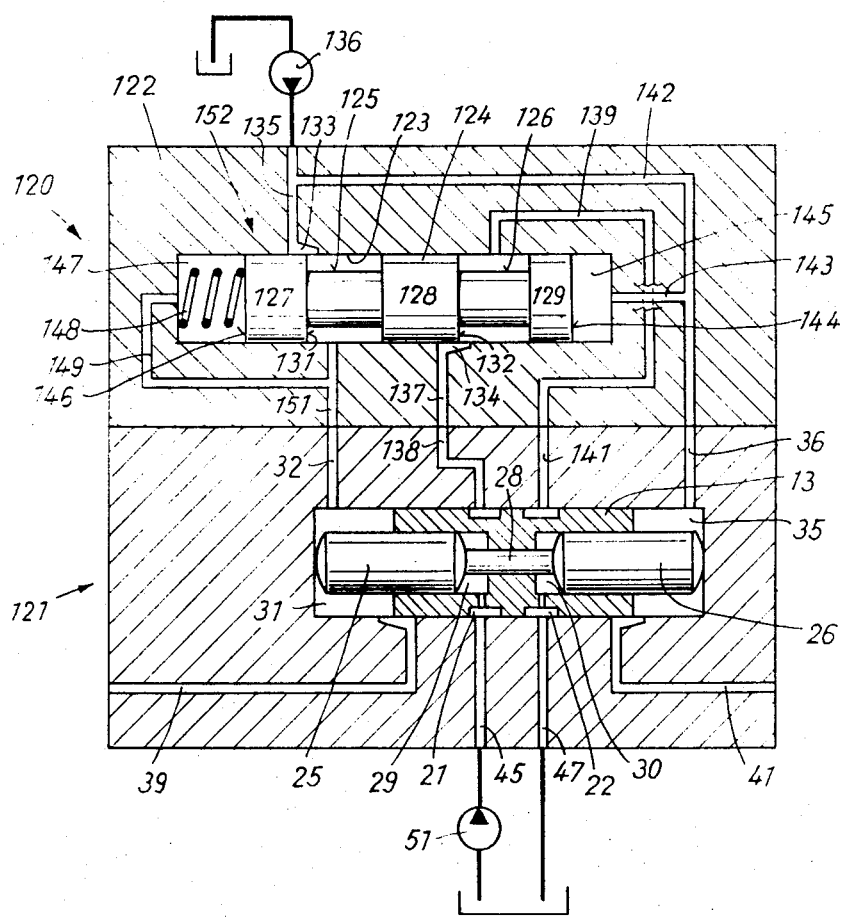
FIG. 3 is a schematic sectional view illustrating a third embodiment of the invention in a simplified manner.

The illustration of the embodiment of FIG. 3 is extremely schematical, and it will be understood that not all conduits are located in the same plane, as illustrated for the sake of simplicity in FIG. 3. The means by which the pressure differentials between chambers of the same pair are produced, are not throttles, but a control valve slide.

The construction of the regulating valve 121, which is shown in the lower part of FIG. 3 corresponds to the construction described with reference to FIG. 1, and corresponding parts are indicated by like reference numerals. A control valve means 120 cooperates with the regulating valve means 121 to obtain the required pressure differentials in chambers 31, 35 and 29, 30.

Control valve 120 has a housing body 122 with a cylinder bore 123 in which a control valve slide 124 is slidably guided in sealed condition. Control valve slide 124 is divided by two annular recesses 125, 126 into three piston portions 127, 128, 129 which are rigidly connected with each other. Piston portion 127 has a control edge 131 and piston portion 128 has a control edge 132. Control edges 131 and 132 cooperate with ports 133 and 134 of the inlet 135, and of a conduit 137, 138 which is connected with the annular recess 21 in regulating valve slide 113 which communicates with the control inlet 45 of control pump 51.

The ports 133 and 134 permit the flow of small amounts of fluid therethrough, and are so shaped and constructed that the ratio of the open flow cross-sections thereof is constant and independent of the position of the control valve slide 124. The ports and cooperating control edges of control valve slide 124 create pressure differentials. The inlet 135 receives pressure fluid from a pump 136 which pumps the pressure fluid through a conduit 149 into a chamber 147, and through a conduit 151 into conduit 32 of regulating valve 121 so that the pressure fluid flows through chamber 31 and the first outlet 39.

The control fluid from pump 51 flows through control inlet 45, annular space 21, conduits 138, 137, port 134, annular recess 126 into a conduit 139 which is connected with conduit 141 which communicates with the annular space 22 and with the control outlet 47 which leads to a container from which control pump 51 sucks the control fluid.

Inlet 135 communicates with an inlet conduit 141 connected by conduit 143 with control chamber 145 of the pair of control chambers 147, 145. Inlet conduit 142 is also connected by conduit 36 with the chamber 35 of the pair of chambers 31, 35 on opposite sides of regulating valve slide 13.

Chambers 31 and 35 respectively communicate with the first outlet 39 and the second outlet 41 which have control ports cooperating with control edges on valve slide 13, as described with reference to FIG. 1.

Inlet conduit 142 communicates through a duct 143 with chamber 145, and the corresponding chamber 147 is connected by a duct 149 with conduits 151, 32. A spring 148 is provided in chamber 147 and biasses the control valve slide 124 to the right to decrease the volume of the chamber 145.

The control valve means 120 constitutes a differential pressure means for producing pressure differentials. The cooperation between the control edge 131 and port 103 has the effect of a throttle in the inlet 135, 32, and the cooperation of the port 134 with the control edge 132 of the control valve slide 124 has the effect of a throttle connecting control inlet 45 with control out 47, but the open flow cross-section of the port 134 depends also on the open cross-section of port 133 caused by axial movements of control valve slide 124.

The apparatus operates as follows:

The control pump 51 pumps a variable control flow, whose amount can be selected through the control inlet 45, annular recess 21, conduits 138, 137 to control ports 134, and the fluid flows through annular recess 126, conduits 139, 141, annular recess 22 and control outlet back to the container from which control pump 51 sucks the control fluid. A pressure differential is produced at the control port 134 which is effective in chambers 29 and 30, respectively, to urge control slide 13 to move to reduce the volume of chamber 30.

At the same time, a flow of a pressure fluid is supplied by pressure pump 136 and flows partly through inlet 135, control port 133, conduits 151 and 32 into chamber 31 and out of the same to the first outlet 39, while another part of the pressure fluid flows through conduits 142 and 36 into chamber 35 and out of the second outlet 41. The pressure differential produced at the control port 133 creates a force in chamber 145 which balances the force of spring 148 in chamber 147, so that the pressure differential is maintained constant and independent of the amount of fluid flowing through inlet 135. The pressure fluid also acts in chambers 31 and 35 on regulating valve slide 13, biassing the same to reduce the volume of chamber 31.

Due to the fact that all effective faces of regulating valve slide 13 in chambers 29, 30, 31 and 35 have equal areas, regulating valve slide 13 assumes a balanced position in which the pressure differentials acting thereon balance each other. Furthermore, since the control ports 133, 134 in the control valve 120 are so constructed and shaped that, independently of the position of control slide 124, the ratio of the open flow cross-sections of ports 133, 134 remains constant, the stream of pressure fluid through control port 134, so that the flow of pressure fluid in the outlet 39 is continuously regulated depending on the volume of control fluid displaced by control pump 51.

The apparatus illustrated in FIG. 3 is particularly suited for operational conditions at which the amounts of pressure fluid vary within a wide range. In contrast to standard throttles, the differential pressure means 133, 131 maintains the pressure differential constant and independent of the amount of fluid, so that the loss of efficiency is relatively low. Furthermore, the sensitivity of the regulation is independent of the amount of pressure fluid flowing through the apparatus, and consequently very good over wide ranges of regulation.

As explained above, the apparatus of the invention can also be constructed in such a manner that the ratios of the effective surfaces of valve slides 13 and 63 is different.

In regulating apparatus as described, it is possible to connect the secondary outlets 41, and 101, respectively, to additional consumers. If there is no additional demand for pressure fluid, the energy loss due to circulation of the fluid is substantially reduced, if the excess fluid is used for reducing the amount of fluid displaced by pump 136, which in this event has to be constructed as adjustable pump.

The control fluid can be pumped by a small pump 51, which may operate on the tacho generator principle, or is supplied from a hydraulically controlled computer or data processing apparatus.

It will be understood that each of the elements described above, or two or more together, may also find a useful application in other types of apparatus for regulating a first flow depending on a controlled second flow differing from the types described above.

While the invention has been illustrated and described as embodied in a regulating valve means controlled by throttles or control valve means to assume a position in which a first flow produced by a pressure pump is proportionate to a second flow produced by a control pump, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Apparatus for regulating a first flow depending on a controlled second flow, comprising first supply means for a pressure fluid; second supply means for a control fluid; regulating valve means including a regulating valve cylinder having first inlet means connected with said first supply means and first outlet means for a flow of said pressure fluid, second inlet means connected with said second supply means and second outlet means for a flow of said control fluid, said regulating valve means further including a regulating valve slide forming in said cylinder, a first pair of variable chambers both connected with said first inlet means and outlet means, and means forming with said valve slide a second pair of variable chambers connected with said second inlet means and second outlet means, respectively, said variable chambers of said first and second pairs being disposed so that the fluid pressures in the variable chambers of each pair act in opposite directions on said valve slide, and each chamber of each pair increases and decreases as the correlated chamber of the same pair decreases and increases in volume, respectively; and differential pressure means for producing a pressure differential between said variable chambers of each pair until said valve slide assumes a balanced position in which the flow of said pressure fluid depends on the controlled flow of said control fluid and varies with said controlled flow.

2. Apparatus as claimed in claim 1 wherein said first outlet means include first and second outlets for a main flow and for a secondary flow of said pressure fluid, said first and second outlets having ports; wherein said valve slide has control edges cooperating with said ports, respectively; and wherein said valve slide has a normal balanced position in which pressure fluid flows through both said second outlets so that when said valve slide is displaced out of said normal position, one of said ports is reduced and closed while the respective other port is increased in size.

3. Apparatus as claimed in claim 1 wherein said differential pressure means include control valve means between said first and second inlet means and said first and second outlet means, respectively.

4. Apparatus for regulating a first flow depending on a controlled second flow, comprising first supply means for a pressure fluid; second supply means for a control fluid; regulating valve means comprising a stationary housing including a stationary regulating valve cylinder having first inlet means connected with said first supply means and first outlet means for a flow of said pressure fluid, second inlet means connected with said second supply means and second outlet means for a flow of said control fluid, said regulating valve means further comprising a regulating valve slide forming in said cylinder a first pair of variable chambers both connected with said first inlet means and outlet means, and stationary piston means forming in said valve slide a second pair of variable chambers connected with said second inlet means and second outlet means, respectively, said variable chambers of said first and second pairs being disposed so that the fluid pressures in the variable chambers of each pair act in opposite directions on said valve means, and each chamber of each pair increases and decreases as the correlated chamber of the same pair decreases and increases in volume, respectively; and differential pressure means for producing a pressure differential between said variable chambers of each pair until said valve means assumes a balanced position in which the flow of said pressure fluid depends on the controlled flow of said control fluid and varies with said controlled flow.

5. Apparatus as claimed in claim 4 wherein said valve slide has two end portions formed with cylinder bores, and a central portion between the same formed with a bearing bore; and wherein said piston means include two pistons respectively located in said cylinder bores, and a connecting piston rod between said pistons passing through said bearing bore in sealing contact and slidably supporting said valve slide, said pistons forming in said cylinder bores said second pair of variable chambers, and having end portions projecting from said second pair of variable chambers into said first pair of variable chambers and abutting said housing.

6. Apparatus as claimed in claim 4 wherein said first outlet means include first and second outlets having first and second ports opening into said variable chambers of said first pair, respectively, and wherein said piston means has control edges cooperating with said ports, respectively, for controlling the flow through said first and second ports and outlets.

7. Apparatus as claimed in claim 4 wherein said regulating valve slide forms in said valve cylinder a pair of annular recesses, said regulating valve slide having end portions formed with cylinder bores; wherein said stationary pistons are respectively located in said cylinder bores forming in said cylinder bores said second pair of variable chambers; wherein said inlet means include a first pair of inlets communicating with said first pair of variable chambers, respectively, and a second pair of inlets communicating with said pair of annular recesses, respectively; wherein said first outlet means include a pair of outlets having ports communicating with said annular recesses, respectively; and wherein said valve slide has in said annular recesses control edges cooperating with said ports to vary the flow through the same.

8. Apparatus as claimed in claim 7 wherein said differential pressure means include first throttle means in one inlet of said first pair of inlets, and in one inlet of said second pair of inlets, and second throttle means connecting said second inlet means with said second outlet means.

9. Apparatus as claimed in claim 8 wherein said differential pressure means includes third throttle means located in the other inlet of said second pair of inlets.

10. Apparatus as claimed in claim 9 wherein one of said first and second throttle means is variable.

11. Apparatus as claimed in claim 4 wherein said pressure differential means includes first throttling means in said first inlet means, and second throttling means connecting said control inlet with the second control outlet.

12. Apparatus as claimed in claim 11 wherein at least one of said first and second throttling means is variable.

13. Apparatus for regulating a first flow depending on a controlled second flow, comprising first supply means for a pressure fluid; second supply means for a control fluid; regulating valve means having first inlet means connected with said first supply means and first outlet means for a flow of said pressure fluid, second inlet means connected with said second supply means and second outlet means for a flow of said control fluid, said regulating valve means forming a first pair of variable chambers both connected with said first inlet means and outlet means, and a second pair of variable chambers connected with said second inlet means and second outlet means, respectively, said variable chambers of said first and second pairs being disposed so that the fluid pressures in the variable chambers of each pair act in opposite directions on said valve means, and each chamber of each pair increases and decreases as the correlated chamber of the same pair decreases and increases in volume, respectively; said first inlet means including two inlet conduits and said first outlet means including two outlet conduits communicating with said variable chambers of said first pair, respectively, and differential pressure means for producing a pressure differential between said variable chambers of each pair until said valve means assumes a balanced position in which the flow of said pressure fluid depends on the controlled flow of said control fluid and varies with said controlled flow, said differential pressure means including a throttle in one of said inlet conduits, and another throttle connecting said second inlet means with said second outlet means.

14. Apparatus for regulating a first flow depending on a controlled second flow, comprising first supply means for a pressure fluid; second supply means for a control fluid; regulating valve means having first inlet means connected with said first supply means and first outlet means for a flow of said pressure fluid, second inlet means connected with said second supply means and second outlet means for a flow of said control fluid, said regulating valve means forming a first pair of variable chambers both connected with said first inlet means and outlet means, and a second pair of variable chambers connected with said second inlet means and second outlet means, respectively, said variable chambers of said first and second pairs being disposed so that the fluid pressures in the variable chambers of each pair act in opposite directions on said valve means, and each chamber of each pair increases and decreases as the correlated chamber of the same pair decreases and increases in volume, respectively; and differential pressure means for producing a pressure differential between said variable chambers of each pair until said valve means assumes a balanced position in which the flow of said pressure fluid depends on the controlled flow of said control fluid and varies with said controlled flow, said differential pressure means including control valve means between said first and second inlet means and said first and second outlet means, respectively, said control valve means including a control slide having a first control edge controlling the flow of pressure fluid from said first inlet means to one variable chamber of said first pair of variable chambers, and a second control edge controlling the flow of control fluid from said second inlet means to said second outlet means.

15. Apparatus as claimed in claim 14 wherein said first inlet means includes a first inlet conduit having a first port cooperating with said first control edge, and wherein said second inlet means includes an inlet having a second port cooperating with said second control edge, said ports and control edges being shaped so that during movement of said control edges over said ports, the ratio of the open flow cross sections of said first and second ports is constant and independent of the position of said control slide.

* * * * *